(12) United States Patent
Watanabe et al.

(10) Patent No.: US 6,459,564 B1
(45) Date of Patent: Oct. 1, 2002

(54) ELECTRICAL DOUBLE LAYER CAPACITOR AND PORTABLE ELECTRONIC APPARATUS EQUIPPED WITH ELECTRICAL DOUBLE LAYER CAPACITOR

(75) Inventors: Shunji Watanabe; Hideharu Onodera; Tsugio Sakai; Toyoo Harada; Yoshimi Kanno; Shinichi Takasugi; Tsuneaki Tamachi, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/490,833

(22) Filed: Jan. 25, 2000

(30) Foreign Application Priority Data

Jan. 26, 1999 (JP) .............................. 11-17700
Sep. 8, 1999 (JP) ........................... 11-254915

(51) Int. Cl.[7] ................................ H01G 9/00
(52) U.S. Cl. .................. 361/502; 361/503; 361/523; 361/528; 29/25.03
(58) Field of Search ................ 361/502, 503, 361/433, 505, 512, 517, 528; 29/502, 508, 523, 527, 25.03

(56) References Cited

U.S. PATENT DOCUMENTS

| | | | |
|---|---|---|---|
| 4,713,731 A | * 12/1987 | Boos et al. ................. 361/433 |
| 4,725,926 A | * 2/1988 | Morimoto et al. ........... 361/433 |
| 4,737,889 A | * 4/1988 | Nishino et al. ............. 361/433 |
| 5,429,893 A | * 7/1995 | Thomas ...................... 429/218 |
| 5,555,155 A | * 9/1996 | Patel et al. .................. 361/503 |
| 5,709,968 A | * 1/1998 | Shimizu ..................... 429/198 |
| 5,744,258 A | * 4/1998 | Bai et al. ....................... 429/3 |
| 5,953,204 A | * 9/1999 | Suhara et al. ............... 361/502 |

* cited by examiner

Primary Examiner—Anthony Dinkins
Assistant Examiner—Nguyen T Ha
(74) Attorney, Agent, or Firm—Adams & Wilks (57) ABSTRACT

An electrical double layer capacitor has an electrolyte comprised of a non-aqueous solvent and a supporting salt dissolved in the non-aqueous solvent. A pair of polarizing electrodes are disposed in confronting relation with one another. A separator is disposed between the polarizing electrodes. The supporting salt contained in the electrolyte exists only in regions proximate a surface of the polarizing electrodes when the electrical double layer capacitor is fully charged. The non-aqueous solvent contains a preselected amount of dissolved supporting salt calculated from a surface area of the polarizing electrodes and a size of a molecule of the supporting salt in an ionized state.

11 Claims, 5 Drawing Sheets

Fig. 1

PRIOR ART

Fig. 2A
Discharged state

Fig. 2B
Fully charged state

Fig. 3A

Discharged state

Fig. 3B

Fully charged state

ELECTRICAL DOUBLE LAYER CAPACITOR AND PORTABLE ELECTRONIC APPARATUS EQUIPPED WITH ELECTRICAL DOUBLE LAYER CAPACITOR

BACKGROUND OF THE INVENTION

The present invention relates to a high-performance electrical double layer capacitor formed by utilizing the principle of electrical double layer.

Electrical double layer capacitors are conventionally used as a backup power supply for semiconductor memory, as an auxiliary power source for electronic devices (such as microcomputers and IC memories), as a battery for solar watches, and as a power source to drive motors. They have recently been expected to find use as a power source for electric vehicles and as an auxiliary unit for energy conversion and storage systems.

In the case of an electrical double layer capacitor with electrodes formed from carbonaceous material, such as activated carbon, activated carbon fiber, and carbon black, its electric capacity depends basically on the surface characteristics and the BET specific surface area (measured by nitrogen adsorption) of the carbonaceous material, and its internal resistance is governed by the electric conductivity of the electrolyte. Therefore, there has been an increasing trend toward employing an electrolyte with a high electrical conductivity for reduction in internal resistance and for improvement in quick recharging performance and heavy current discharging performance.

Electrical double layer capacitors vary in appliable voltage depending on the kind of electrolyte employed therein. The appliable voltage is 2V or less in the case of an aqueous electrolyte formed by dissolving a supporting salt in water. By contrast, it is about 3V in the case of a non-aqueous electrolyte. In practical use, however, when a voltage of 2.5V or more is applied, the advantage of a non-aqueous electrolyte over an aqueous one diminishes because of its drawbacks, such as decomposition evolving gas and side reactions to dissolve the casing, leading to liquid leakage and capacity decrease. In addition, a non-aqueous electrolyte has a disadvantage of wasting electric power due to the leak current which flows when charging voltage remains on after full charging has occurred.

SUMMARY OF THE INVENTION

The present inventors have found that the electrical double layer capacitor greatly increases in withstanding voltage if the amount of supporting salt is reduced to such an extent that the electrolyte substantially becomes an insulator after the electrical double layer has been formed. They employed a process which consists of moving close to the electrode surface almost all the ionized supporting salt contained in the electrolyte when fully charged. This process creates a state in which, even when a high voltage remains applied, the electrolyte remote from the electrode is free of the ionized supporting salt which brings about side reactions. As a result, the electrolyte becomes nearly an insulator after the electrical double layer has been formed by full charging. Thus, a higher voltage can be applied without side reactions, and leak current after full charging decreases, resulting in power saving. In addition, the present inventors have found that the withstanding voltage increases with the decreasing ratio of the negative electrode capacity to the positive electrode capacity.

BRIEF DESCRIPTION OF THE DRAWINGS

FIGS. 2A and 2B are schematic diagrams illustrating the principle of the electrical double layer capacitor according to the prior art technology, where FIG. 2A and FIG. 2B show the electrical double layer capacitor in a discharged state and a fully charged state, respectively;

FIGS. 3A and 3B are schematic diagrams illustrating the principle of the electrical double layer capacitor according to the present invention where FIG. 3A and FIG. 3B show the electrical double layer capacitor in a discharged state and a fully charged state, respectively;

DETAILED DESCRIPTION OF THE PREFERRED EMBODIMENTS

On the electrode surface with full charging, an electrical double layer is formed by the ionized supporting salt. The amount of the supporting salt adsorbed is determined by the surface area of the electrode and the voltage applied. If the supporting salt exists in an excess amount as compared with the surface area of the electrode, the supporting salt continues to exist in the electrolyte even after full charging. If the amount of the supporting salt is small, the supporting salt is adsorbed close to the electrode surface and hence hardly exists in the electrolyte remote from the electrode.

Figure 2A:
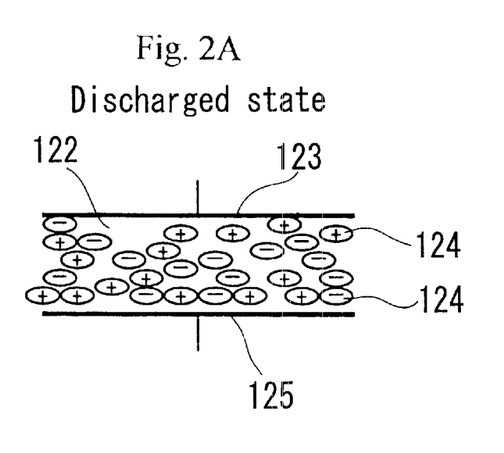
Figure 2B:
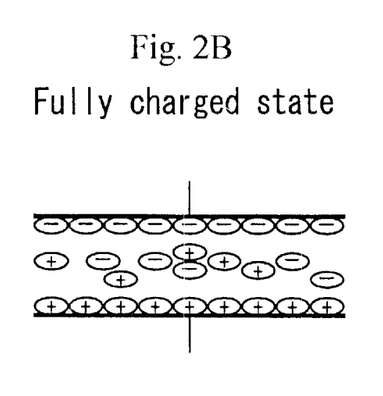

The invention will be described below with reference to FIGS. 2A–2B and 3A–3B. When fully charged, it is in the state as shown in FIG. 2B. The conventional electrical double layer capacitor is designed to dissolve more supporting salt 124 in the non-aqueous solvent 122 than the supporting salt moving close to the surface of positive electrode 123 and surface of negative electrode 125 after full charging in order to permit quick charging and reduce internal resistance. If the voltage applied in this state exceeds 2.5V, the excess supporting salt 124 existing between the electrodes brings about side reactions, such as decomposition of electrolyte and dissolution of casing. These side reactions lead to trouble such as solution leakage and capacity decrease.

Figure 3A:
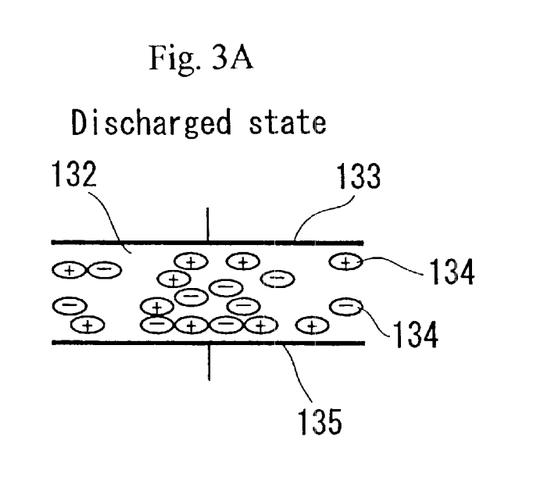
Figure 3B:
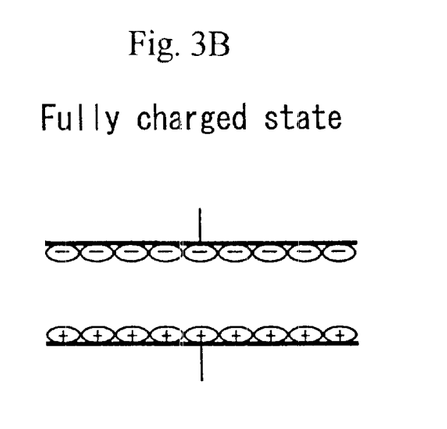

The electrical double layer capacitor according to the present invention is in the state as shown in FIG. 3B, with a voltage applied after full charging. Apparently, the supporting salt 134 moves in the vicinity of the surface of positive electrode 133 and surface of negative electrode 135. The supporting salt 134 does not exist in the non-aqueous solvent 132 any longer and the electrolyte becomes an insulator. The supporting salt 134 in this state does not bring about side reactions (such as decomposition of electrolyte and dissolution of casing) even though the applied voltage exceeds 2.5V. The withstanding voltage in such conditions would be the breakdown voltage of the non-aqueous solvent. Ideally, the concentration of the supporting salt in the electrolyte should be null after full charging, for the electrical double layer capacitor to increase in withstanding voltage. In practice, however, it has been experimentally confirmed that the withstanding voltage is effectively increased if the internal resistance of the capacitor after full charging is greater than ten times that of before charging. The amount of the supporting salt to be dissolved may be roughly calculated from the surface area of the electrode and the size of the ionized supporting salt. For example, the amount of the supporting salt to be dissolved in the electrolyte in the electrical double layer capacitor is given by $(A \times B/C^2)/N_A$ mol (where A is the specific surface area ($m^2/g$) of activated carbon, B is the amount (g) of activated carbon on one side of the electrode, C is a side (m) of a square corresponding to the molecule of the ionized supporting salt, and $N_A$ is Avogadro's constant). The calculated value is merely a measure because the ionized supporting salt does not always form a monomolecular layer when adsorbed onto the surface of the electrode. To determine the amount of the supporting salt in practice, the calculated value should be adequately modified within the reliability required, with the charging voltage taken into account.

If the amount of the supporting salt dissolved in the electrolyte is such that the ionized supporting salt remains in a small amount after full charging, the voltage decrease in the initial discharging period can be prevented to some extent. In addition, the withstanding voltage increases further if the negative electrode capacity is decreased relative to the positive electrode capacity.

The present inventors' extensive investigations revealed that the electrical double layer capacitor varies in electrode potential at the time of charging depending on the capacity ratio of the positive electrode and negative electrode. The results of measurements of the electrical potential in the battery are mentioned below. An electrolyte was prepared by dissolving 1 mole of $(CH_3)(C_2H_5)_3NBF_4$ (as a supporting salt) in 1liter of propylene carbonate (PC). In this electrolyte, a positive electrode and a negative electrode both made of activateded carbon were immersed, with its capacity ratio varied. A voltage of 3.3V was applied across the positive electrode and the negative electrode, and the electrode potential relative to the lithium reference electrode was measured. The results are shown in Table 1.

TABLE 1

| Positive electrode | | Negative electrode | |
| --- | --- | --- | --- |
| Capacity ratio | Potential (V vs. Li) | Capacity ratio | Potential (V vs. Li) |
| 1 | 4.8 | 1 | 1.6 |
| 2 | 4.5 | 1 | 1.25 |
| 2.5 | 4.4 | 1 | 1.1 |
| 3 | 4.3 | 1 | 1 |

Both the positive electrode and negative electrode gave an electrode potential of 3.0V vs. Li before voltage application. When a voltage was applied across the positive electrode and negative electrode immersed in an electrolyte, the positive electrode potential increased and the negative electrode potential decreased as the ionized supporting salt became adsorbed.

When a voltage of 3.3V was applied across the positive electrode and negative electrode whose capacity ratio (which is equivalent to weight ratio because they are made of the same material) is 1:1, the positive electrode potential increased by 1.8V (reaching 4.8V vs. Li) and the negative electrode potential decreased by 1.4V (reaching to 1.6V vs. Li). This indicates that the positive electrode potential fluctuates more than the negative electrode potential. If the capacity ratio of the negative electrode is reduced relative to the capacity ratio of the positive electrode, the negative electrode potential fluctuates more than the positive electrode potential.

The reason for this is presumed as follows. When one electrode is restricted in its area, the amount of electrolyte ions to be adsorbed onto it from the other electrode is limited. This adsorption resistance brings about polarization, which raises the positive electrode potential and decreases the negative electrode potential.

The positive electrode potential should be kept at 4.5V vs. Li or less so as to prevent the decomposition of the electrolyte. On the other hand, if the negative electrode potential decreases to around 1.1V vs. Li, gas will be evolved due to reactions between PC and activated carbon.

For the battery to have a withstanding voltage of 3.3V, it is necessary that the positive electrode potential is not higher than 4.5V vs. Li and the negative electrode potential is not lower than 1.1V vs. Li. Alternatively, it is necessary that the concentration of the supporting salt should be low enough to prevent side reactions on the electrodes at the above-mentioned critical positive electrode and negative electrode potential. It is apparent from Table 1 that the ratio of the positive electrode capacity to the negative electrode capacity should be around 2:1, within a permissible range from 2.5±0.5:1.

The electrical double layer capacitor greatly increases in withstanding voltage if the concentration of the supporting salt and the ratio of the electrode area are controlled simultaneously. It increases in output voltage if the negative electrode has a smaller area than the positive electrode so that the negative electrode voltage decreases. Since the potential difference between the positive electrode and the negative electrode determines the output voltage of the electrical double layer capacitor, a reduction in the negative electrode potential leads to an increase in output voltage.

The electrodes of the electrical double layer capacitor may be formed from activated carbon powder by pressing or rolling together with an adequate binder., The activated carbon powder may be obtained by activating sawdust, coconut husk, pitch, or the like. The activated carbon may be replaced by activated carbon fiber which is obtained from phenolic fiber, rayon fiber, acrylic fiber, or pitch fiber by infusibilization or carbonization. The carbon fiber may be used in the form of felt, fiber, paper, or sintered body. Other carbonaceous materials include polyaniline (PAN) and polyacene (PAS).

The active materials for the positive electrode and negative electrode may be the same or different, and more than one active materials may be used in combination.

The electrolyte is not specifically restricted. It may be any non-aqueous solvent used for conventional electrical double layer capacitors and non-aqueous secondary batteries. Cyclic esters, chain esters, cyclic ethers, chain ethers or the like can be used for the non-aqueous solvent. Their specific examples are: propylene carbonate (PC), ethylene carbonate (EC), butylene carbonate (BC), vinylene carbonate, dimethyl carbonate (DMC), diethyl carbonate (DEC), γ-butyrolactone (γ-BL), 2-methyl-γ-butyrolactone, acetyl-γ-butyrolactone, γ-valerolactone, 1,2-dimethoxyethane (DME), 1,2-ethoxyethane, diethyl ether, ethyleneglycol dialkyl ether, diethyleneglycol dialkyl ether, triethyleneglycol dialkyl ether, tetraethyleneglycol dialkyl ether, dipropylene carbonate, methyl ethyl carbonate, methyl butyl carbonate, methyl propyl carbonate, ethyl butyl carbonate, ethyl propyl carbonate, butyl propyl carbonate, propionic alkyl ester, malonic dialkyl ester, acetic alkyl ester, tetrahydrofuran (THF), alkyltetrahydrofuran, dialkyltetrahydrofuran, alkoxytetrahydrofuran, dialkoxytetrahydrofuran, 1,3-dioxolane, alkyl-1,3-dioxolane, 1,4-dioxolane, 2-methyltetrahydrofuran, dimethylsulfbxide, 1,3-dioxolane, formamide, dimethylformamide, dioxolane, acetonitrile, nitromethane, methyl formate, methyl acetate, methyl propionate, ethyl propionate, phosphoric triester, maleic anhydride, sulfolane, and 3-methylsulfolane. Their derivatives are also included. They may be used alone or in combination.

These non-aqueous solvents may contain water and organic hydroxides (e.g., glycol, alcohol, and carboxylic acid), as impurities. It is considered that impurities form an insulating film on the surface of the electrode, thereby increasing the interfacial resistance of the electrode, with the result that the cycle life and capacity decrease and the self-discharge increases during storage at high temperatures (60° C. or higher). Thus the content of impurities should be as low as possible. Specifically, the content of water should be 50 ppm or less and the content of organic hydroxides should be 1000 ppm or less.

The examples for the supporting salt include $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PBF_6$, $(C_2H_5)_4PCF_3SO_4$, $(C_2H_5)_4NPF_6$, lithium perchlorate $(LiClO_4)$, lithium hexafluorophosphate $(LiPF_6)$, lithium borofluoride $(LiBF_6)$, lithium hexafluoroarseide $(LiAsF_6)$, lithium trifluorometasulfonate $(LiCF_3SO_3)$, bis-trifluoromethylsulfonylimide lithium $[LiN(CF_3SO_2)_2]$, lithium thiocyanate, and lithium aluminum fluoride. They may be used alone or in combination. Of these examples, ammonium salts are preferable from the standpoint of cycle characteristics and storage properties.

The above-mentioned supporting salt may be used in combination with a polyethylene oxide derivative (or a polymer containing it), a polypropylene oxide derivative (or a polymer containing it), a phosphate ester polymer or the like.

The electrical double layer capacitor of the present invention may be used in the form of coil, button, sheet, cylinder, or cube. More than one unit may be connected in series or parallel or laminated.

EXAMPLE 1

This example demonstrates a battery in which activated carbon is used as the positive electrode active material and the negative electrode active material. The battery is shown in section in FIG. 1. The battery measures 6.8 mm in outside diameter and 2.1 mm thick.

Figure 1:
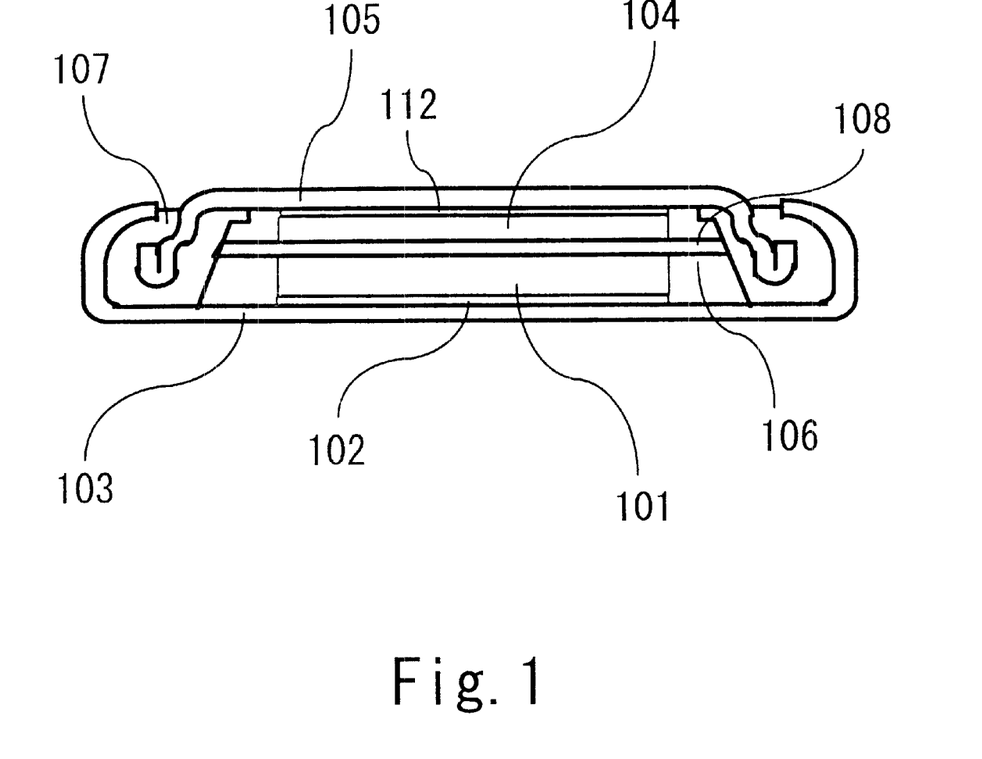
FIG. 1 is a sectional view of the electrical double layer capacitor according to the present invention.

The battery was produced in the following manner. First, an positive electrode mixture was prepared from commercially available activated carbon (with a specific surface area of 2260 m²/g), carbon black as a conducting material, and fluorocarbon plastics as a binder in a mixing ratio of 80:12:8 by weight. The positive electrode mixture was formed into a sheet, 0.8 mm in thickness and about 0.4 g/cm³ in volume density. This sheet was punched into circular electrode pellets, 4 mm in diameter. Each electrode pellet contains 3.2 mg of activated carbon. The electrode pellet (functioning as the positive electrode 101) is bonded to the positive electrode case 103 with a conductive resin adhesive containing conductive carbon (functioning as the electrode collector 102). The assembly was heated at 150° C. for 8 hours for drying under reduced pressure. Likewise, the electrode pellet (functioning as the negative electrode 104) is bonded to the negative electrode case 105 with a conductive resin adhesive containing conductive carbon (functioning as the electrode collector 112). The assembly was heated at 150° C. for 8 hours for drying under reduced pressure. The negative electrode case 105 was inserted into the groove for the gasket 107.

The electrolyte 106 is composed of PC and $(CH_3)(C_2H_5)_3NBF_4$ as a supporting salt. The amount of the electrolyte is 15 μL. The amount of the supporting salt ranges from 0 to 1 mol/L. (To be more specific, 0.01 mol/L, 0.10 mol/L, 0.20 mol/L, 0.25 mol/L, 0.30 mol/L, 0.35 mol/L, 0.5 mol/L, and 1.0 mol/L.) The concentration of 1.0 mol/L is the one which is used for conventional electrical double layer capacitors.

With the electrolyte 106 added, the negative electrode case 105 and the positive electrode case 103 were combined together and the latter was crimped for sealing. Thus there was obtained the desired capacitor.

Figure 4:
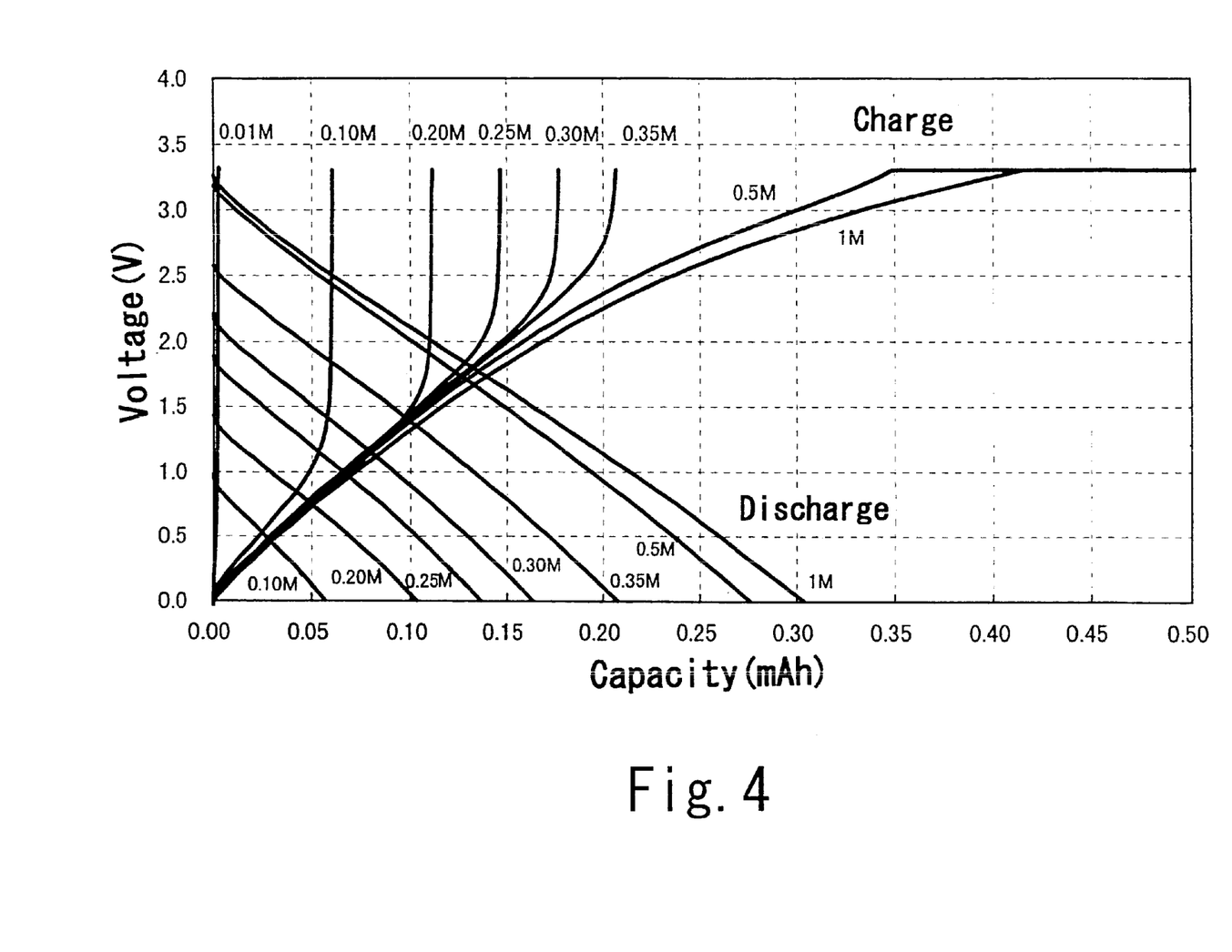
FIG. 4 is a graph showing the charge-discharge characteristics of the electrical double layer capacitor in Example 1.

The electrical double layer capacitor produced as mentioned above was tested for charging-discharging characteristics. The results are shown in FIG. 4. Charging was carried out at a charge voltage of 3.3V until the charge current decreased from 200 μA (maximum) to 20 μA. Discharging was carried out at a constant current of 50 μA until the end voltage reached 0V.

It is also noted from FIG. 4 that the voltage increases rapidly because the ionized supporting salt is adsorbed completely to the surface of activated carbon in the case of a supporting salt in low concentrations. A probable reason for this is that the ionized supporting salt in PC vanishes, causing the solution resistance to increase rapidly.

By contrast, in the case of a supporting salt in high concentrations, the ionized supporting salt continues to exist in the electrolyte even after the electrical double layer has been formed on the surface of activated carbon, with the result that current continues to flow, bringing about side reactions such as decomposition of electrolyte and dissolution of casing. Since the capacitor using activated carbon usually has a withstanding voltage of about 2.5V, it should preferably be designed such that the double layer is formed completely and the solution resistance rises at 2.5V. FIG. 4 suggests that 0.3 mol/L or 0.35 mol/L is an adequate concentration under the condition in this example.

The electrical double layer capacitors obtained in this example were examined for leak current (with 3.3V or 5.0V applied), increase in internal resistance after storage for 20 days, and swelling of battery (in terms of increase in battery height). The results are shown in Table 2.

TABLE 2

| No. | Concentration of supporting salt (mol/L) | Initial characteristics Internal resistance (Ω) | Initial characteristics Leak current (μA 3.3 V) | Initial characteristics Leak current (μA 5.0 V) | Characteristics after storage at normal temperature for 20 days (3.3 V) Increase in battery height (mm) | Characteristics after storage at normal temperature for 20 days (3.3 V) Increase in internal resistance (Ω) | Characteristics after storage at normal temperature for 20 days (5.0 V) Increase in battery height (mm) | Characteristics after storage at normal temperature for 20 days (5.0 V) Increase in internal resistance (Ω) |
|---|---|---|---|---|---|---|---|---|
| 1 | 0    | 45000 | 0    | 0    | 0    | 0   | 0    | 0    |
| 2 | 0.01 | 580   | 0    | 0.04 | 0    | 0   | 0    | 0    |
| 3 | 0.10 | 68    | 0.15 | 0.21 | 0    | 0   | 0    | 1    |
| 4 | 0.20 | 45    | 0.26 | 0.28 | 0    | 1   | 0    | 0    |
| 5 | 0.25 | 38    | 0.69 | 0.72 | 0    | 1   | 0    | 3    |
| 6 | 0.30 | 35    | 0.77 | 0.84 | 0    | 2   | 0    | 2    |
| 7 | 0.35 | 32    | 1.2  | 1.5  | 0    | 2   | 0    | 1    |
| 8 | 0.50 | 26    | 4.9  | 6.8  | 0.05 | 193 | 0.2  | 336  |
| 9 | 1.00 | 21    | 8.2  | 72   | 0.16 | 285 | 0.22 | 3500 |

The leak current is the current which flows through the electrical double layer capacitor after voltage application for 24 hours. The internal resistance is the resistance which appears when, after voltage application for a prescribed period of time, the electrical double layer capacitor is discharged for 5 minutes by short-circuiting. The resistance was measured by the AC impedance technique at 1 kHz.

It is noted from Table 2 that the samples in which the concentration of the supporting salt in the electrolyte is 0.35 mol/L or less are satisfactory, with a low leak current and no or little increase in internal resistance and battery height after storage. However, the one with a concentration of 0.01 mol/L or less has an impracticably high internal resistance and small capacity before storage.

EXAMPLE 2

Among the electrical double layer capacitors obtained in Example 1 was selected one which holds the electrolyte containing the supporting salt in a concentration of 0.35 mol/L. After application of an excess voltage of 18V for 60 minutes, it was tested for battery height and internal resistance. For comparison, Sample No. 9 (equivalent to the conventional one) in Example 1 was also tested in the same way. The results are shown in Table 3.

TABLE 3

| No | Concentration of supporting salt (mol/L) | Initial characteristics, internal resistance (Ω) | Characteristics after voltage application (18 V) for 60 minutes Increase in battery height (mm) | Characteristics after voltage application (18 V) for 60 minutes Increase in internal resistance (Ω) |
|---|---|---|---|---|
| Conventional | 1 | 21 | 0 | 0 |
| Present invention | 0.35 | 32 | 0.2 | 45 |

It is noted from Table 3 that the electrical double layer capacitor according to the present invention remained unchanged in battery height and internal resistance. It is presumed that theoretically it has a withstanding voltage high enough for PC to break down.

EXAMPLE 3

Electrical double layer capacitors differing in electrolyte active material and supporting salt as shown in Table 4 were prepared in the same way as in Example 1. The weight of the positive electrode active material 3.2 mg, the amount of the electrolyte is 15 μL, and the size of the battery is 6.8 mm in outside diameter and 2.1 mm in height.

The results are shown in Table 4. It is noted that the conventional electrolyte double layer capacitor increases in both battery height and internal resistance after storage at 80° C. for 5 days (3.3V). On the other hand, it is noted that the electrolyte double layer capacitor according to the present invention is satisfactory (with small change in battery height and internal resistance) in the case where the electrode is made with activated carbon or polyacene (PAS) or a combination thereof. It is noted that PC or γ-BL/EC as the non-aqueous solvent for the electrolyte produces good results. As for the supporting salt, ammonium salt produces good results.

TABLE 4

| | Positive electrode active material | Negative electrode active material | Electrolyte Non-aqueous solvent | Supporting salt | Conc. of supporting salt (mol/L) | Initial characteristics Internal resistance ($\Omega$) | Leak current ($\mu$A, 3.3 V) | Characteristics after storage at 80° C. for 5 days (3.3 V) Increase in battery height (mm) | Increase in internal resistance ($\Omega$) |
|---|---|---|---|---|---|---|---|---|---|
| * | Activated carbon | Activated carbon | PC | $(CH_3)(C_2H_5)_3NBF_4$ | 1 | 21 | 8.2 | 0.15 | 255 |
| 1 | Activated carbon | Activated carbon | PC | $(CH_3)(C_2H_5)_3NBF_4$ | 0.35 | 32 | 1.2 | 0 | 1 |
| 2 | Activated carbon | Activated carbon | PC | $(C_2H_5)_4NBF_4$ | 0.35 | 34 | 1 | 0 | 0 |
| 3 | Activated carbon | Activated carbon | $\gamma$-BL/EC | $(CH_3)(C_2H_5)_3NBF_4$ | 0.35 | 27 | 1.3 | 0 | 2 |
| 4 | Activated carbon | Activated carbon | $\gamma$-BL/EC | $(C_2H_5)_4NBF_4$ | 0.35 | 29 | 1.1 | 0 | 0 |
| 5 | PAN | PAN | PC | $(CH_3)(C_2H_5)_3NBF_4$ | 0.3 | 22 | 1.5 | 0 | 3 |
| 6 | PAN | PAN | PC | $(C_2H_5)_4NBF_4$ | 0.3 | 21 | 1.4 | 0 | 2 |
| 7 | PAN | PAN | $\gamma$-BL/EC | $(CH_3)(C_2H_5)_3NBF_4$ | 0.3 | 19 | 1.5 | 0 | 1 |
| 8 | PAN | PAN | $\gamma$-BL/EC | $(C_2H_5)_4NBF_4$ | 0.3 | 20 | 1.6 | 0 | 0 |
| 9 | Activated carbon | PAN | PC | $(CH_3)(C_2H_5)_3NBF_4$ | 0.27 | 30 | 0.8 | 0 | 0 |
| 10 | Activated carbon | PAN | PC | $(C_2H_5)_4NBF_4$ | 0.27 | 32 | 0.7 | 0 | 1 |
| 11 | Activated carbon | PAN | $\gamma$-BL/EC | $(CH_3)(C_2H_5)_3NBF_4$ | 0.27 | 30 | 0.5 | 0 | 1 |
| 12 | Activated carbon | PAN | $\gamma$-BL/EC | $(C_2H_5)_4NBF_4$ | 0.27 | 31 | 0.9 | 0 | 1 |

*Conventional product

EXAMPLE 4

Figure 5:
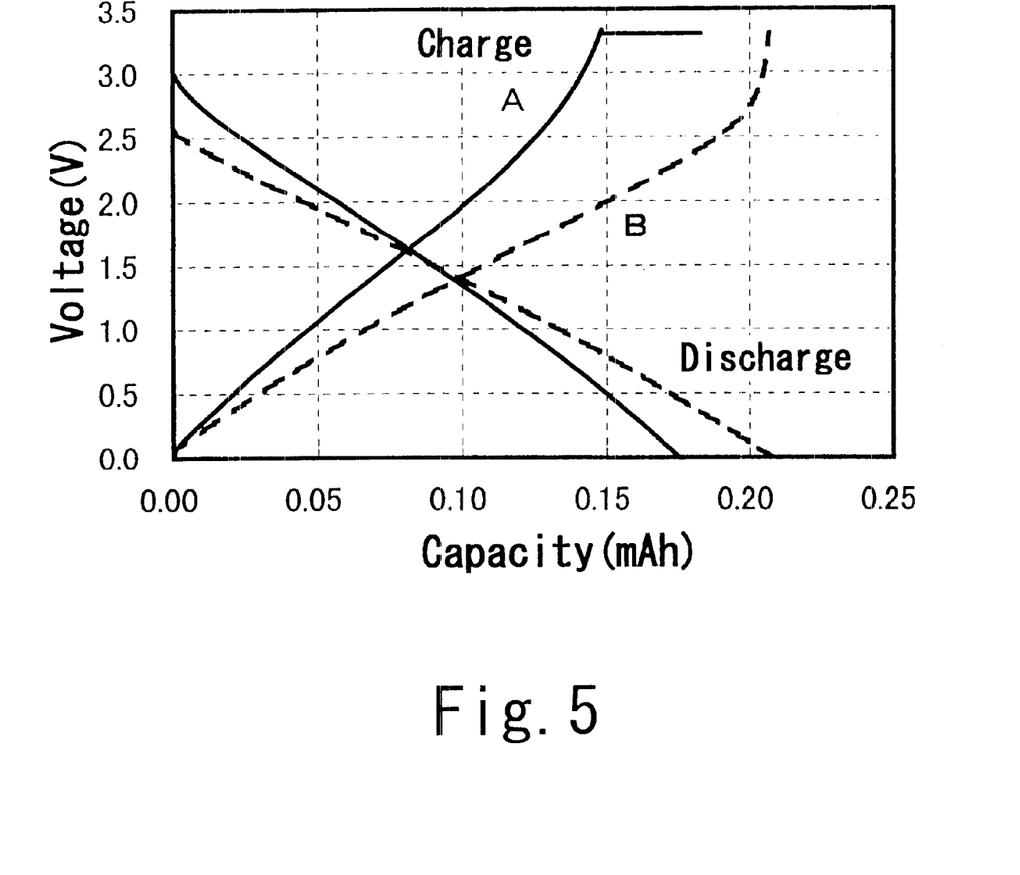
FIG. 5 is a graph showing the charge-discharge characteristics of the electrical double layer capacitor in Example 4.

An electrical double layer capacitor, in which the electrolyte contains 0.35 mol/L of supporting salt, was prepared in the same way as in Example 1 except that the positive electrode is 1.0 mm thick and the negative electrode is 0.5 mm so that the capacities of the positive electrode and negative electrode are in a ratio of 2:1. This capacitor is designated as sample A, and the capacitor in which the electrolyte contains 0.35 mol/L of supporting salt in Example 1 is designated as sample B. They were examined for charging and discharging characteristics. The results are shown in FIG. 5.

It is noted that as compared with the sample B, the sample A has a higher discharge starting voltage despite its slightly smaller capacity.

EXAMPLE 5

An electrical double layer capacitor, in which the electrolyte contains 0.35 mol/L of supporting salt, was prepared in the same way as in Example 1. It was connected in series with four solar cells (in series), so that it functions as a power source of the resulting solar watch. For comparison, a solar watch was produced with a conventional. electrical double layer capacitor, in which the electrolyte contains 1.0 mol/L of supporting salt. The electrical double layer capacitor has no reverse-current preventing circuit, over-current preventing circuit, and over-discharge preventing circuit.

The thus obtained solar watch was irradiated with light (50000 lux) in a thermostat at 60° C. The electrical double layer capacitor was examined for voltage during charging by the solar cell. It was found that the battery voltage increased from 0 to 2.5V. After full charging, the voltage increased to 3.2V at maximum. Irradiation with light (50000 lux) was continued for one month. After irradiation, the electrical double layer capacitor was removed, and it was examined for internal resistance and. discharge capacity. The internal resistance was measured by the AC impedance technique at 1 kHz after it had been short-circuited for 5 minutes.

The results are shown in Table 5.

TABLE 5

| No. | Concentration of supporting salt (mol/L) | Initial Characteristics Internal resistance ($\Omega$) | Capacity (mAh) | Characteristics after Irradiation for one month Internal resistance ($\Omega$) | Capacity (mAh) |
|---|---|---|---|---|---|
| Conventional | 1 | 20 | 0.3 | 260 | 0.26 |
| This invention | 0.35 | 30 | 0.3 | 30 | 0.3 |

It is noted that the electrical double layer capacitor according to the present invention does not deteriorate after continued irradiation when used for a solar watch. The same effect as this was confirmed also in the case of a solar calculator.

When the electrical double layer capacitor of the, present invention is combined with a solar cell, the resulting machine permits the solar cells to be connected in series as many as desired without protective circuits. Therefore, it permits effective charging in a dimly-lit room or under an overcast sky. The increased number of units connected in series permits voltage to be raised and hence permits rapid charging. This leads to high performance at a low cost.

EXAMPLE 6

The electrical double layer capacitor of the present invention was used for memory backup in a portable telephone. It was tested for leak current which is consumed when the portable telephone is in waiting state.

It was found that the leak current was 8.2 $\mu$A and 1.2 $\mu$A, in the case of the conventional one and the one according to the present invention, respectively. In addition, the current consumed in the one according to the present invention is about one-eighth that of the conventional one. This is because the electrical double layer capacitor of the present invention increases infinitely in charging resistance when fully charged. This prevents the capacity of the main power source from decreasing while the portable telephone is being used.

The electrical double layer capacitor of the present invention has high reliability, and hence it can be used in combination with heat-resistant parts for reflow-soldering.

The electrical double layer capacitor of the present invention exhibits greatly improved withstanding voltage at the time of charging and deterioration of its characteristics due to changing can be suppressed to an extremely low level. In addition, it can be used for portable machines without requiring charging control circuits or the like. It have a very small leak current during charging, and this contributes to inexpensive machines with small power consumption.

What is claimed is:

1. An electrical double layer capacitor comprising: an electrolyte comprised of a non-aqueous solvent and a supporting salt dissolved in the non-aqueous solvent; a pair of polarizing electrodes disposed in confronting relation with one another; and a separator disposed between the polarizing electrodes; wherein the supporting salt contained in the electrolyte exists only in regions proximate a surface of the polarizing electrodes when the electrical double layer capacitor is fully charged; and wherein the non-aqueous solvent contains a preselected amount of dissolved supporting salt calculated from a surface area of the polarizing electrodes and a size of a molecule of the supporting salt in an ionized state.

2. An electrical double layer capacitor according to claim 1; wherein the polarizing electrodes are selected from the group consisting of an activated carbon and a polyaniline.

3. An electrical double layer capacitor according to claim 1; wherein the supporting salt comprises ammonium salt.

4. An electrical double layer capacitor according to claim 1; wherein the pair of polarizing electrodes comprises a negative electrode and a positive electrode having a larger capacity than that of the negative electrode.

5. A portable electronic apparatus having an electrical double layer capacitor according to claim 1.

6. A portable electronic apparatus according to claim 5; wherein the polarized electrodes of the electrical double layer capacitor are selected from the group consisting of an activated carbon and a polyaniline.

7. A portable electronic apparatus according to claim 5; wherein the supporting salt of the electrical double layer capacitor comprises ammonium salt.

8. A portable electronic apparatus according to claim 5; wherein the pair of polarized electrodes of the electrical double layer capacitor comprises a negative electrode and a positive electrode having a larger capacity than that of the negative electrode.

9. An electrical double layer capacitor according to claim 1; wherein the amount of supporting salt dissolved in the non-aqueous solvent of the electrolyte is in the range of 0.3 mol/L to 0.35 mol/L.

10. An electrical double layer capacitor comprising: an electrolyte comprised of a non-aqueous solvent and a supporting salt dissolved in the non-aqueous solvent; a pair of polarizing electrodes disposed in confronting relation with one another; and a separator disposed between the polarizing electrodes; wherein the supporting salt contained in the electrolyte exists only in regions proximate a surface of the polarizing electrodes when the electrical double layer capacitor is fully charged; and wherein the amount of dissolved supporting salt is calculated from the formula $(A \times B/c^2)N_A$ mol, where A is the specific surface area of activated carbon, B is the amount of activated carbon on one side of the polarized electrodes, C is the length of a side of a square corresponding to a molecule of the supporting salt in an ionized state, and $N_A$ is Avogadro's constant.

11. An electrical double layer capacitor comprising: a negative electrode; a positive electrode; and an electrolyte disposed between the negative and positive electrode and containing a supporting salt in a preselected amount so that the supporting salt migrates close to a surface of the negative electrode and a surface of the positive electrode and does not exist in the electrolyte in a fully charged state of the electrical double layer capacitor; wherein the amount of supporting salt contained in the electrolyte is calculated from the formula $(A \times B/c^2)N_A$ mol, where A is the specific surface area of activated carbon, B is the amount of activated carbon on one side of the polarized electrodes, C is the length of a side of a square corresponding to a molecule of the supporting salt in an ionized state, and $N_A$ is Avogadro's constant.

* * * * *